(No Model.)

G. C. ELLIOTT.
NUT LOCK.

No. 445,166.  Patented Jan. 27, 1891.

Witnesses.
H. R. Omohundro
James P. Elliott

Inventor.
George C. Elliott
By, Jno. G. Elliott
Atty.

UNITED STATES PATENT OFFICE.

GEORGE CRAWFORD ELLIOTT, OF CHICAGO, ILLINOIS, ASSIGNOR, BY DIRECT AND MESNE ASSIGNMENTS, TO LUELLA M. ELLIOTT, OF SAME PLACE, ROBERT BLACKSTOCK AND IRA B. BLACKSTOCK, OF PAXTON, ILLINOIS, AND WILLIAM M. BLACKSTOCK, OF LAFAYETTE, INDIANA.

NUT-LOCK.

SPECIFICATION forming part of Letters Patent No. 445,166, dated January 27, 1891.

Application filed February 12, 1889. Serial No. 299,607. (No model.)

*To all whom it may concern:*

Be it known that I, GEORGE CRAWFORD ELLIOTT, a citizen of the United States, and a resident of Chicago, in the county of Cook and State of Illinois, have invented certain new and useful Improvements in Nut-Locks, of which the following is a specification.

This invention relates to improvements in that class of devices known as nut-locks for rigidly securing a nut at any point of its adjustment upon a bolt against accidental displacement by jarring or otherwise, and has for its prime object to convert an ordinary nut into a lock-nut, and thereby avoid the necessity for having a specially-made nut, and at the same time enable the employment of nuts of any quality and the utilization of nuts already in use.

Another object is to promote the nicety of the adjustment of the nut without diminishing the strength of the lock therefor by a peculiar arrangement and location of the parts, as hereinafter described.

I attain these objects by the devices illustrated in the accompanying drawings, in which—

Figure 1:
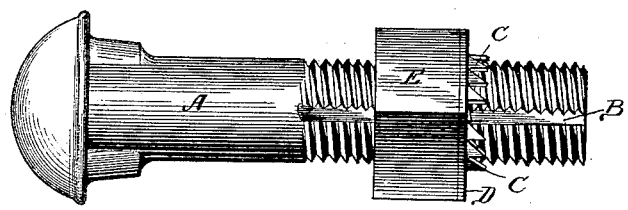
Figure 2:
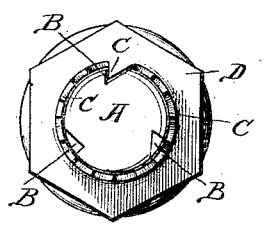
Figure 3:
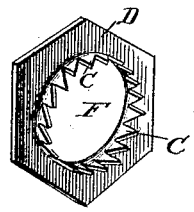
Figure 4:
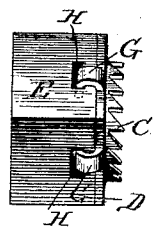
Figure 5:
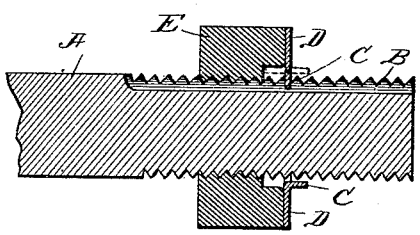

Figure 1 represents a plan view of a screw-bolt having a nut and lock applied thereto embodying my invention; Fig. 2, an end elevation of the same; Fig. 3, a perspective view of the locking-plate; and Fig. 4, a side elevation of a nut with the locking-plate applied thereto, showing a modified form of fastening for securing the plate to the nut; Fig. 5, a detail vertical section.

Similar letters of reference indicate the same parts in the several figures of the drawings.

Referring by letter to the accompanying drawings, A indicates a screw-bolt provided with a series of longitudinal peripheral grooves B, extending the entire length of the screw-threaded portion of the bolt and preferably angular in form with reference to the periphery, in order to form a straight shoulder on one side of the groove at substantially a right angle relative to the periphery thereof. Into one of these grooves is designed to fit a tooth or projection C, corresponding in shape with said groove and bent or struck down from a locking-plate D, secured to the nut E in any known or convenient manner. This locking-plate is composed of malleable metal and preferably has the general form of the nut in end elevation, with a central opening F therein corresponding in size with the threaded opening of the nut, around the edge of which is arranged the series of teeth or projections C, standing at a right angle from the face thereof, so that when one of the teeth registers with one of the grooves in the bolt after the nut has been screwed up into position, the tooth may be bent down so as to project into the groove, and thus securely lock the nut against a reverse rotation tending to displace the same upon the bolt, due either to jarring, an accidental blow, or tampering therewith by unauthorized parties. This locking-plate is secured to the outer face of the nut either by welding, by screws working therethrough and tapped into the nut, or by lips G, (see Fig. 4,) projecting from the edges thereof and bent into sockets H in the nut, or in any other suitable and convenient manner which will firmly unite the two members together. By this arrangement I am enabled to convert any ordinary nut into a lock-nut, and at the same time employ nuts and bolts of any quality of material, and thus not only enable the filling of any contract as to the quality of the material employed, but also avoid the extra expense of a nut specially made for this purpose; and, further, I am also enabled to utilize the old bolts and nuts already in use at a very small cost for the application of my invention thereto. The location or arrangement of the grooves in the bolt is also of importance, in that I am thereby enabled to employ a less number of teeth upon the locking-plate and each of correspondingly greater strength, and at the same time secure a better adjustment of the locking devices, so as to make the locking of the nut at almost any point of its adjustment upon the bolt, which obviously is an impossibility when a single groove is depended upon. To this end, instead of arranging the series of grooves around the periphery of the bolt at intervals corresponding exactly with the distance between any number of teeth, which would permit several of the teeth to engage corresponding grooves at the same time, I divide the periphery of the bolt into regular or unequal parts, so that when one of the grooves registers with a tooth the other grooves will lie one-third or two-thirds or one-fourth, two-fourths, or three-fourths of the distance between the points and bases of the other teeth, according to the number of the grooves employed; and this number may vary as desired, for the greater the number of course the finer the adjustment. In other words, the teeth being all of equal length, I take the length of one tooth and divide it into as many parts as there are to be grooves in the bolt—say, for instance, three grooves, as shown in the drawings. Hence I would divide the length of the tooth into three parts, and in spacing the grooves would have the first register with one of the teeth; the next located a distance away corresponding with the length of any number of intermediate teeth and one-third the length of one tooth additional, and the next groove further around corresponding with the length of all of the intermediate teeth with two-thirds the length of a single tooth added. In this way I am enabled to lock the nut at any point of its rotation corresponding with a third of the length of one tooth, and obviously if more grooves were employed the nicety of adjustment of the lock would be correspondingly increased; and not only that, but I am enabled to employ locking-teeth of a greater length and strength than is possible with any other construction and at the same time secure the maximum adjustment thereof.

For convenience of removing the nut from the bolt without the necessity of drawing the teeth out of the groove toward the front, I provide an annular recess I in the face of the nut of a depth substantially corresponding with the length of the teeth and of sufficient diameter to permit the teeth to lie bodily therein without interfering with the revolving of the nut upon the bolt, as clearly shown in Fig. 5 of the drawings. Thus in order to remove the nut it is only necessary to drive the tooth inwardly until it lies wholly within this recess, when the nut may be readily revolved upon the bolt, and as this recess opposes all the teeth, it is obviously immaterial which one of them is employed for locking the nut in position, because when it is desired to be removed the teeth may be disposed of as just described.

Having described my invention, what I claim, and desire to secure by Letters Patent, is—

1. The combination, with a screw-bolt provided with a longitudinal peripheral groove, of a nut working on said bolt, a lock-plate secured thereto, and teeth or projections on said plate adapted and arranged to be bent down so as to project into said groove, substantially as described.

2. The combination, with a screw-bolt provided with a series of longitudinal peripheral grooves spaced unequal distances apart, of a nut working on said bolt and a lock plate secured to said nut having a series of teeth or projections spaced equal distances apart and adapted and arranged to be bent so as to project into said grooves, substantially as described.

3. The combination, with a screw-bolt provided with a longitudinal peripheral groove, of a nut working on said bolt provided with an annular recess in one face thereof, a lockplate secured to said nut covering said recess, and teeth or projections on said nut adapted and arranged to be bent down so as to project into said groove or bent inwardly and upwardly so as to lie within said recess, substantially as and for the purpose described.

GEORGE CRAWFORD ELLIOTT.

Witnesses:
A. M. BENNETT,
W. R. OMOHUNDRO.